(12) United States Patent
Hill et al.

(10) Patent No.: US 11,699,836 B2
(45) Date of Patent: *Jul. 11, 2023

(54) LOW FIRING TEMPERATURE DIELECTRIC MATERIALS DESIGNED TO BE CO-FIRED WITH HIGH BISMUTH GARNET FERRITES FOR MINIATURIZED ISOLATORS AND CIRCULATORS

(71) Applicant: SKYWORKS SOLUTIONS, INC., Irvine, CA (US)

(72) Inventors: Michael David Hill, Emmitsburg, MD (US); David Bowie Cruickshank, Rockville, MD (US); Jeffrey Alan Shunkwiler, Adamstown, MD (US); John Jianzhong Jiang, Leesburg, VA (US); David Martin Firor, Thurmont, MD (US); Srinivas Polisetty, Frederick, MD (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 894 days.

This patent is subject to a terminal disclaimer.

(21) Appl. No.: 16/446,877

(22) Filed: Jun. 20, 2019

(65) Prior Publication Data

US 2019/0393579 A1 Dec. 26, 2019

Related U.S. Application Data

(60) Provisional application No. 62/687,984, filed on Jun. 21, 2018.

(51) Int. Cl.

| | |
|---|---|
| *H01P 1/36* | (2006.01) |
| *H01B 3/12* | (2006.01) |
| *H01F 1/03* | (2006.01) |
| *H01P 1/38* | (2006.01) |
| *C01G 31/02* | (2006.01) |

(Continued)

(52) U.S. Cl.
CPC ............... *H01P 1/36* (2013.01); *C01G 31/02* (2013.01); *C04B 35/495* (2013.01);
(Continued)

(58) Field of Classification Search
CPC ... H01P 1/36; H01P 1/38; C01G 31/02; C04B 35/495; C04B 37/001; C04B 2235/3217;
(Continued)

(56) References Cited

U.S. PATENT DOCUMENTS

| | | | |
|---|---|---|---|
| 5,096,878 | A | 3/1992 | Hoshino et al. |
| 7,132,381 | B1 | 11/2006 | Oh et al. |

(Continued)

FOREIGN PATENT DOCUMENTS

| | | |
|---|---|---|
| CN | 101910088 A | 12/2010 |
| CN | 102249664 A | 11/2011 |

(Continued)

OTHER PUBLICATIONS

Machine Translation of KR100698440B1 (Year: 2007).*

(Continued)

*Primary Examiner* — Karl E Group
*Assistant Examiner* — Cameron K Miller
(74) *Attorney, Agent, or Firm* — Lando & Anastasi, LLP

(57) ABSTRACT

Disclosed herein are embodiments of low temperature co-fireable dielectric materials which can be used in conjunction with high dielectric materials to form composite structures, in particular for isolators and circulators for radiofrequency components. Embodiments of the low temperature co-fireable dielectric materials can be scheelite or garnet structures, for example, bismuth vanadate. Adhesives and/or glue is not necessary for the formation of the isolators and circulators.

16 Claims, 13 Drawing Sheets

(51) Int. Cl.
*C04B 35/495* (2006.01)
*C04B 37/00* (2006.01)
*H01F 1/34* (2006.01)

(52) U.S. Cl.
CPC ............. *C04B 37/001* (2013.01); *H01B 3/12* (2013.01); *H01F 1/0315* (2013.01); *H01F 1/346* (2013.01); *H01P 1/38* (2013.01); *C01P 2006/40* (2013.01); *C04B 2235/3217* (2013.01); *C04B 2235/3225* (2013.01); *C04B 2235/3232* (2013.01); *C04B 2235/3239* (2013.01); *C04B 2235/3298* (2013.01); *C04B 2235/764* (2013.01); *C04B 2235/765* (2013.01); *C04B 2237/345* (2013.01); *C04B 2237/84* (2013.01)

(58) Field of Classification Search
CPC .... C04B 2235/3225; C04B 2235/3232; C04B 2235/3239; C04B 2235/3298; C04B 2235/764; C04B 2237/345; H01B 3/12; H01F 1/0315; C01P 2006/40
See application file for complete search history.

(56) References Cited

U.S. PATENT DOCUMENTS

| | | | |
|---|---|---|---|
| 7,687,014 B2 | 3/2010 | Zheng et al. | |
| 11,081,770 B2 * | 8/2021 | Hill | ........................ B32B 18/00 |
| 2010/0279847 A1 | 11/2010 | Shimada | |
| 2013/0050041 A1 | 2/2013 | Cruickshank et al. | |
| 2015/0171501 A1 | 6/2015 | Cruickshank et al. | |
| 2018/0118627 A1 | 5/2018 | Cruickshank et al. | |
| 2018/0166763 A1 | 6/2018 | Cruickshank et al. | |
| 2019/0382316 A1 * | 12/2019 | Hill | .......................... H01P 11/00 |
| 2022/0029263 A1 * | 1/2022 | Hill | ........................... H01P 1/38 |

FOREIGN PATENT DOCUMENTS

| | | | |
|---|---|---|---|
| GB | 2576092 A | | 2/2020 |
| IN | 8301DELNP2007 A | | 4/2006 |
| JP | H07-312509 A | | 11/1995 |
| JP | 2004149382 A | | 5/2004 |
| JP | 2007051050 A | | 3/2007 |
| JP | 2011515998 A | | 5/2011 |
| KR | 10-2007-0021015 A | | 2/2007 |
| KR | 100698440 B1 | * | 2/2007 |
| WO | 2018089853 A1 | | 5/2018 |

OTHER PUBLICATIONS

Office Action from corresponding United Kingdom Application No. 2019933.7 dated Jul. 18, 2022.
International Search Report and Written Opinion from corresponding International Application No. PCT/US2019/038180 dated Oct. 4, 2019.

* cited by examiner

LOW FIRING TEMPERATURE DIELECTRIC MATERIALS DESIGNED TO BE CO-FIRED WITH HIGH BISMUTH GARNET FERRITES FOR MINIATURIZED ISOLATORS AND CIRCULATORS

CROSS-REFERENCE TO RELATED APPLICATIONS

This application claims priority under 35 U.S.C. § 119(e) to U.S. Provisional Patent Application Ser. No. 62/687,984, titled LOW FIRING TEMPERATURE DIELECTRIC MATERIALS DESIGNED TO BE CO-FIRED WITH HIGH BISMUTH GARNET FERRITES FOR MINIATURIZED ISOLATORS AND CIRCULATORS, filed Jun. 21, 2018, which is incorporated by reference herein in its entirety.

BACKGROUND

Field

Embodiments of the disclosure relate to dielectric materials that can be co-fired with ferromagnetic ceramic elements to form circulators or isolators without the use of adhesives.

Description of Related Art

Circulators and isolators are passive electronic devices that are used in high-frequency (e.g., microwave) radio frequency systems to permit a signal to pass in one direction while providing high isolation to reflected energy in the reverse direction. Circulators and isolators commonly include a disc-shaped assembly comprising a disc-shaped ferrite or other ferromagnetic ceramic element, disposed concentrically within an annular dielectric element.

SUMMARY

Disclosed herein are embodiments of a composite material for use as a radiofrequency component comprising a low temperature fireable outer material, the low temperature fireable outer material having a garnet or scheelite structure, and a high dielectric inner material located within the outer material, the high dielectric inner material having a dielectric constant above 30, wherein the low temperature fireable outer material and the high dielectric inner material are configured to be co-fired together at temperature between 650-900° C. without the use of adhesive or glue.

In some embodiments, the low temperature fireable outer material can be shaped like a ring. In some embodiments, the high dielectric inner material can be shaped like a disc.

Also disclosed herein are embodiments of a method of forming a composite material for use as an isolator or circulator in a radiofrequency device, the method comprising providing a low temperature fireable outer material, the low fireable outer material having a garnet or scheelite structure, entering a high dielectric inner material within an aperture in the low temperature fireable outer material, the high dielectric inner material having a dielectric constant above 30, and co-firing the lower temperature fireable outer material and the high dielectric inner material together at temperature between 650-900° C. to shrink the low temperature fireable outer material around an outer surface of the high dielectric inner material without the use of adhesive or glue.

In some embodiments, the method can further include slicing the lower temperature fireable outer material and the high dielectric inner material after co-firing.

Further disclosed herein are embodiments of a radiofrequency isolator or circulator comprising a low temperature fireable outer material, the low temperature fireable outer material having a garnet or scheelite structure, and a high dielectric inner material located within the outer material, the high dielectric inner material having a dielectric constant above 30, wherein the low temperature fireable outer material and the high dielectric inner material are configured to be co-fired together at temperature between 650-900° C. without the use of adhesive or glue.

In accordance with an aspect disclosed herein, there is provided a composite material for use as a radiofrequency component. The composite material comprises a low temperature fireable outer material, the low temperature fireable outer material having a garnet or scheelite structure, and a high dielectric inner material located within the outer material, the high dielectric inner material having a dielectric constant above 30, the low temperature fireable outer material and the high dielectric inner material being configured to be co-fired together at temperature between 650-900° C. to form an integrated magnetic/dielectric assembly without the use of adhesive or glue.

In some embodiments, the low temperature fireable outer material includes $BiVO_4$.

In some embodiments, the high dielectric inner material is shaped like a disc and the low temperature fireable outer material is shaped like a ring.

In some embodiments, the low temperature fireable outer material includes a combination of $BiVO_4$ and $Al_2O_3$.

In some embodiments, the low temperature fireable outer material has a dielectric constant between 20 and 80.

In some embodiments, the $Al_2O_3$ is present in the low temperature fireable outer material an amount up to about 6 wt %.

In some embodiments, $Bi_4V_2O_{11}$ is present in the low temperature fireable outer material as a phase separate from the $BiVO_4$.

In some embodiments, the low temperature fireable outer material further includes one or more of yttrium vanadate, gadolinium vanadate, or titanium oxide.

In some embodiments, the titanium oxide is present in the low temperature fireable outer material in an amount up to 10 wt %.

In some embodiments, one or both of yttrium vanadate, gadolinium vanadate form a solid solution with the $BiVO_4$ in the low temperature fireable outer material.

In some embodiments, the titanium dioxide is present in the low temperature fireable outer material as a phase separate from the $BiVO_4$.

In some embodiments, the gadolinium vanadate is present in the low temperature fireable outer material in an amount up to 50 wt %.

In some embodiments, $Bi_4V_2O_{11}$ and $BiVO_4$ are present in the low temperature fireable outer material as separate phases.

In some embodiments, $Bi_4V_2O_{11}$, $BiVO_4$, and $Bi_2Ti_4O_{11}$ are present in the low temperature fireable outer material as separate phases.

In some embodiments, $Bi_4V_2O_{11}$, $BiVO_4$, $Bi_2Ti_4O_{11}$, and $TiO_2$ are present in the low temperature fireable outer material as separate phases.

In some embodiments, $Bi_4V_2O_{11}$ and $GdVO_4$ are present in the low temperature fireable outer material as separate phases.

In accordance with another aspect, there is provided a method of forming a composite material for use as an isolator or circulator in a radiofrequency device. The method comprises providing a low temperature fireable outer material, the low fireable outer material having a garnet or scheelite structure, entering a high dielectric inner material within an aperture in the low temperature fireable outer material, the high dielectric inner material having a dielectric constant above 30, and co-firing the lower temperature fireable outer material and the high dielectric inner material together at temperature between 650-900° C. to shrink the low temperature fireable outer material around an outer surface of the high dielectric inner material to form an integrated magnetic/dielectric assembly without the use of adhesive or glue.

In some embodiments, the low temperature fireable outer material includes $BiVO_4$.

In some embodiments, the low temperature fireable outer material includes a combination of $BiVO_4$ and $Al_2O_3$.

In some embodiments, the $Al_2O_3$ is present in the low temperature fireable outer material an amount up to about 6 wt %.

In some embodiments, $Bi_4V_2O_{11}$ is present in the low temperature fireable outer material as a phase separate from the $BiVO_4$.

In some embodiments, the low temperature fireable outer material further includes one or more of yttrium vanadate, gadolinium vanadate, or titanium oxide.

In some embodiments, the titanium oxide is present in the low temperature fireable outer material in an amount up to 10 wt %.

In some embodiments, one or both of yttrium vanadate, gadolinium vanadate form a solid solution with the $BiVO_4$ in the low temperature fireable outer material.

In some embodiments, the titanium dioxide is present in the low temperature fireable outer material as a phase separate from the $BiVO_4$.

In some embodiments, the gadolinium vanadate is present in the low temperature fireable outer material in an amount up to 50 wt %.

In some embodiments, $Bi_4V_2O_{11}$ and $BiVO_4$ are present in the low temperature fireable outer material as separate phases.

In some embodiments, $Bi_4V_2O_{11}$, $BiVO_4$, and $Bi_2Ti_4O_{11}$ are present in the low temperature fireable outer material as separate phases.

In some embodiments, $Bi_4V_2O_{11}$, $BiVO_4$, $Bi_2Ti_4O_{11}$, and $TiO_2$ are present in the low temperature fireable outer material as separate phases.

In some embodiments, $Bi_4V_2O_{11}$ and $GdVO_4$ are present in the low temperature fireable outer material as separate phases.

In accordance with another aspect, there is provided a radiofrequency isolator or circulator. The radiofrequency isolator or circulator comprises a low temperature fireable outer material, the low temperature fireable outer material having a garnet or scheelite structure, and a high dielectric inner material located within the outer material, the high dielectric inner material having a dielectric constant above 30, the low temperature fireable outer material and the high dielectric inner material being configured to be co-fired together at temperature between 650-900° C. without the use of adhesive or glue.

In some embodiments, the low temperature fireable outer material includes $BiVO_4$.

In some embodiments, the low temperature fireable outer material includes a combination of $BiVO_4$ and $Al_2O_3$.

In some embodiments, the $Al_2O_3$ is present in the low temperature fireable outer material an amount up to about 6 wt %.

In some embodiments, $Bi_4V_2O_{11}$ is present in the low temperature fireable outer material as a phase separate from the $BiVO_4$.

In some embodiments, the low temperature fireable outer material further includes one or more of yttrium vanadate, gadolinium vanadate, or titanium oxide.

In some embodiments, the titanium oxide is present in the low temperature fireable outer material in an amount up to 10 wt %.

In some embodiments, one or both of yttrium vanadate, gadolinium vanadate form a solid solution with the $BiVO_4$ in the low temperature fireable outer material.

In some embodiments, the titanium dioxide is present in the low temperature fireable outer material as a phase separate from the $BiVO_4$.

In some embodiments, the gadolinium vanadate is present in the low temperature fireable outer material in an amount up to 50 wt %.

In some embodiments, $Bi_4V_2O_{11}$ and $BiVO_4$ are present in the low temperature fireable outer material as separate phases.

In some embodiments, $Bi_4V_2O_{11}$, $BiVO_4$, and $Bi_2Ti_4O_{11}$ are present in the low temperature fireable outer material as separate phases.

In some embodiments, $Bi_4V_2O_{11}$, $BiVO_4$, $Bi_2Ti_4O_{11}$, and $TiO_2$ are present in the low temperature fireable outer material as separate phases.

In some embodiments, $Bi_4V_2O_{11}$ and $GdVO_4$ are present in the low temperature fireable outer material as separate phases.

In some embodiments, the radiofrequency isolator or circulator is included in an electronics device module.

In some embodiments, the radiofrequency isolator or circulator is included in an RF electronics device.

DETAILED DESCRIPTION

Figure 1:
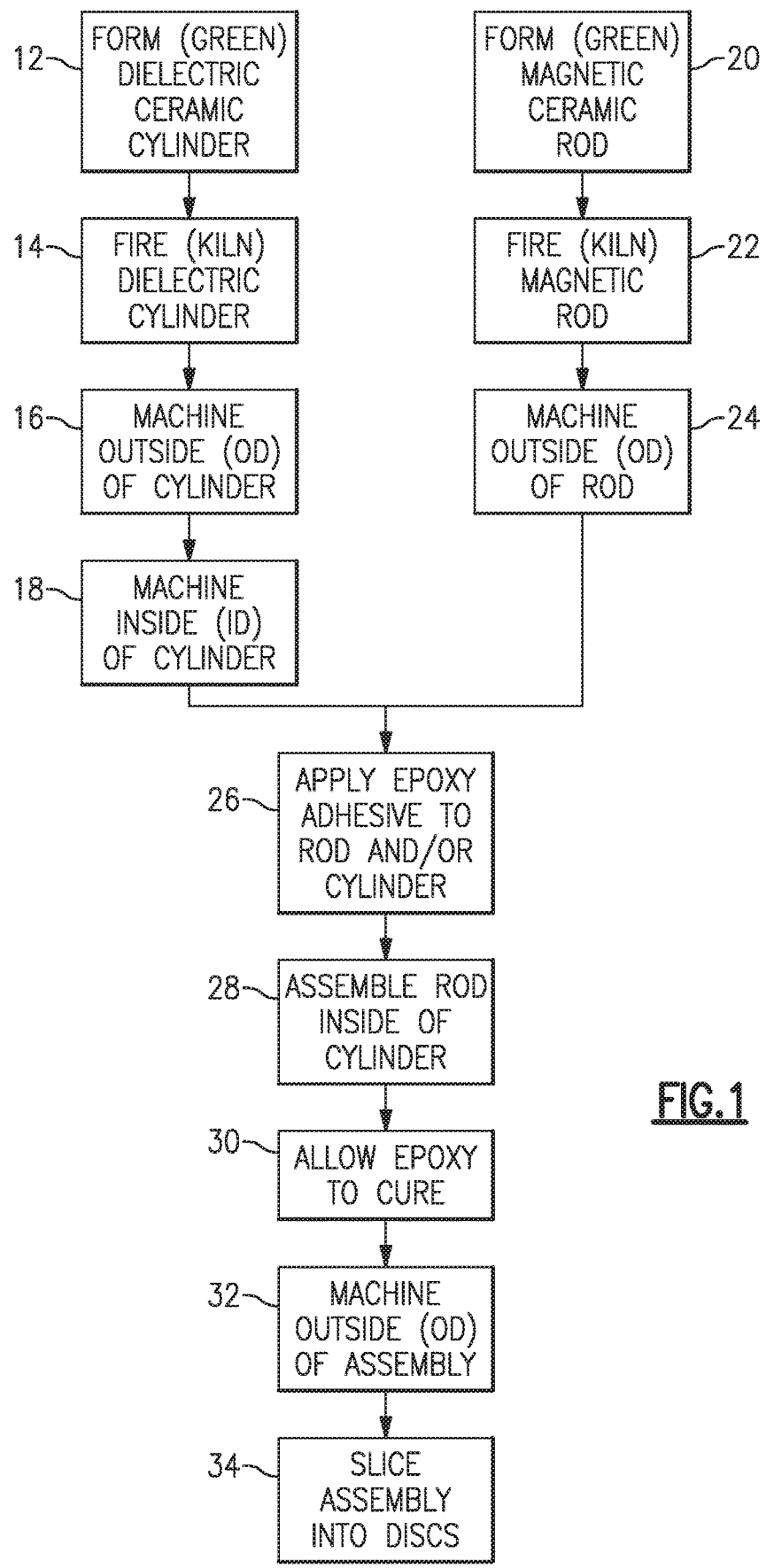
FIG. 1 illustrates a flow diagram of a method for fabricating composite magnetic-dielectric disc assemblies.

One process for making composite disc assemblies for use in, for example, circulators or isolators is illustrated by the flow diagram of FIG. 1. At step 12, a cylinder is formed from a dielectric ceramic material. At step 14, the (unfired or "green") cylinder is then fired in a kiln (commonly referred to simply as "firing"). Thus, the ceramic material is "fireable." At step 16, the outside surface of the cylinder is then machined to ensure its outside diameter (OD) is of a selected dimension. Achieving precise dimensions in the assembly elements is important because the dimensions affect microwave waveguide characteristics. At step 18, the inside surface of the cylinder is similarly machined to ensure its inside diameter (ID) is of a selected dimension. In addition, at step 20, a rod is formed from a magnetic ceramic material. At step 22, the rod is then fired, and at step 24 its surface is machined to a selected OD. The rod OD is slightly less than the cylinder OD so that the rod can be fitted securely within the cylinder, as described below. Achieving a close fit that promotes good adhesion between the rod and cylinder is a reason that both the outside surface of the rod and the inside surface of the cylinder are machined to precise tolerances. Steps 14 and 22 have conventionally been performed separately because the firing temperature for ceramic materials conventionally used for the dielectric cylinder is higher than magnetic ceramic material could tolerate.

At step 26, epoxy adhesive is applied to the one or both of the rod and cylinder. At step 28, the rod is inserted inside the cylinder to form a rod-and-cylinder assembly, and the epoxy is allowed to cure (harden), as indicated by step 30. At step 32, the outside surface of the rod-and-cylinder assembly is again machined to a precise OD. Lastly, at step 34, the rod-and-cylinder assembly is sliced into a number of disc assemblies. Each disc assembly thus comprises a magnetic ceramic disc disposed concentrically within a dielectric ceramic ring. Each disc assembly is typically several millimeters in thickness.

The time involved in machining the inside surface of the cylinder and outside surface of the magnetic rod to promote adhesion, applying epoxy to the parts, carefully handling and assembling the epoxy laden parts, and curing the epoxy, contributes to inefficiency in the process. Moreover, heat generated during cutting of the cylinder and rod assembly into individual discs may melt the epoxy (or other adhesive) holding these parts together, resulting in epoxy being released from between the cylinder and rod and forming undesirable voids between the cylinder and rod and undesirable deposits of epoxy on the surface of the resultant discs. It would be desirable to provide a more efficient method for making composite magnetic-dielectric disc assemblies.

Disclosed herein are embodiments of low firing dielectric materials. These materials can be co-fired with high dielectric constant materials to form composite structures for magnetic-dielectric assemblies, such as for isolator and circulator applications. Advantageously, embodiments of the disclosed materials can be co-fired with magnetic ceramic elements without needing any adhesives, such as glue, epoxy or other chemical adhesives to attach the dielectric materials to the ferromagnetic ceramic elements. Thus, composites formed out of embodiments of the disclosure can be glue free, epoxy free, or adhesive free.

Embodiments of the disclosure could advantageously allow for 5G systems, in particular operating at 3 GHz and above, to form integrated architectures which can include different components, such as antennas, circulators, amplifiers, and/or semiconductor based amplifiers. By allowing for the integration of these components onto a single substrate, this can improve the overall miniaturization of the device. In some embodiments, the disclosed devices can be operable at frequencies between about 1.8 GHz and about 30 GHz. In some embodiments, the disclosed device can be operable at frequencies of greater than about 1, 2, 3, 4, 5, 10, 15, 20, or 25 GHz. In some embodiments, the disclosed device can be operable at frequencies of less than 30, 25, 20, 15, 10, 5, 4, 3, or 2 GHz.

In some embodiments, the integrated architecture can include a directional coupler and/or isolator in a package size which is not much larger than a standard isolator. In some embodiments, the integrated architecture can include a high power switch.

Figure 2:
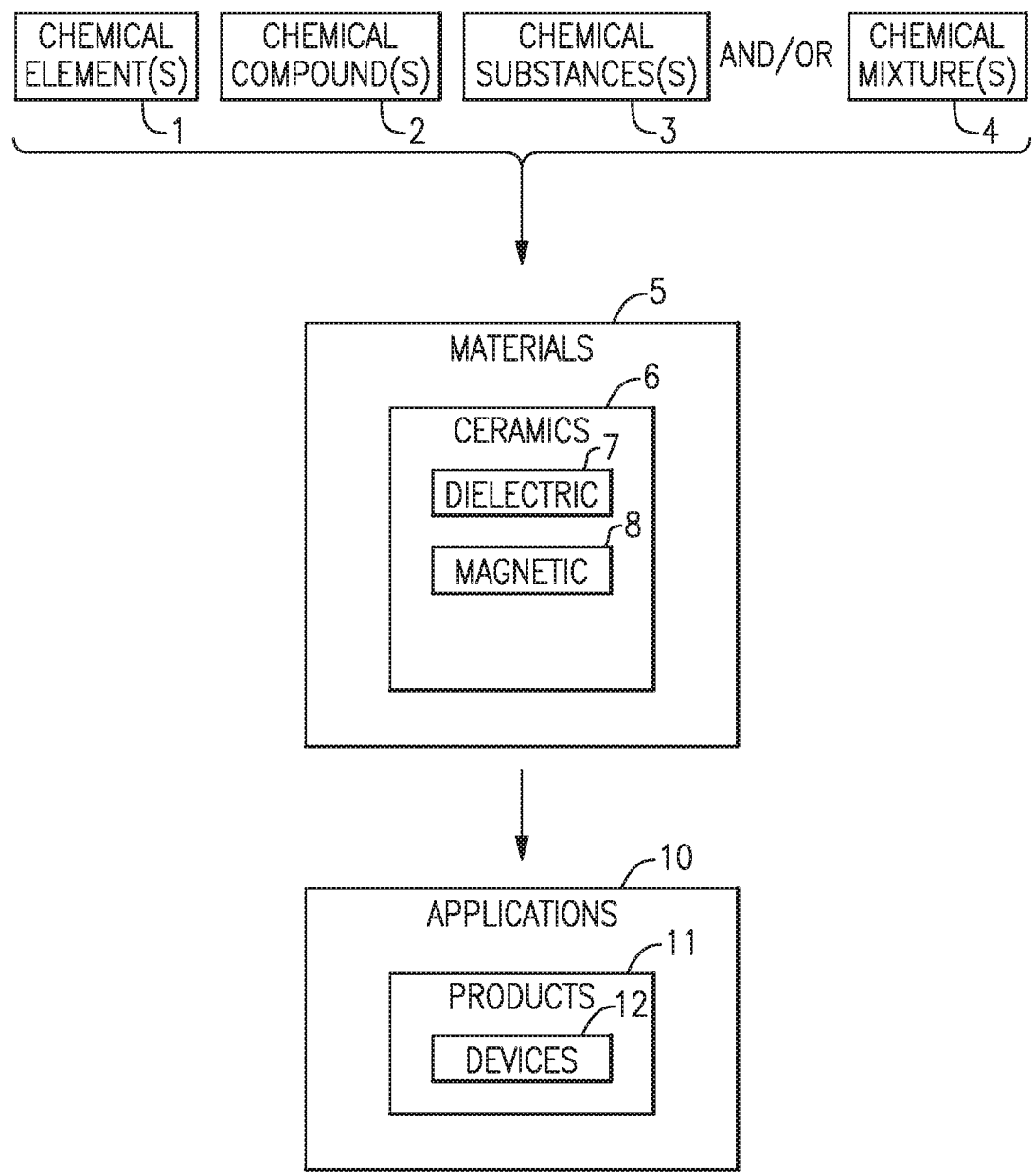
FIG. 2 schematically shows how materials having one or more features described herein can be designed, fabricated, and used.

FIG. 2 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7) and/or magnetic property (block 8).

In some embodiments, a material having one or more of the foregoing properties can be implemented for use in applications (block 10) such as radio-frequency (RF) applications. Such applications can include implementations of one or more features as described herein in devices 12. In some applications, such devices can further be implemented in products 11. Examples of such devices and/or products are described herein.

Microstrip Circulators/Isolators

Circulators are passive multiport devices which can receive and transmit different signals, such as signals having frequencies in the microwave or radio frequency (RF) bands. The ports of a circulator can be an external waveguide or transmission line which connects to and from the circulator. Isolators are similar to circulators, but one or more of the ports can be blocked off. Hence, circulator and isolator can be used interchangeably herein as they can be similar in general structure. Thus, all discussion below can apply both to circulators and isolators.

Microstrip circulators and isolators are devices known in the art and consist of a thin film circuit deposited over a substrate, such as a dielectric ferrite substrate. In some embodiments, one or more ferrite discs can be adhered onto the substrate. Magnet(s) can then be further attached to circulate a signal through the ferrite disc.

All-ferrite microstrip circulators have been used as well, in particular for radar transmit/receive (T/R) modules. Circuitry can be printed onto the all-ferrite microstrip circulator and a magnet can be added on top to direct the signal. For example, a metallization pattern may be formed onto a ferrite substrate. Typically, the metallization pattern consists of a central disc and multiple transmission lines.

Figure 3:
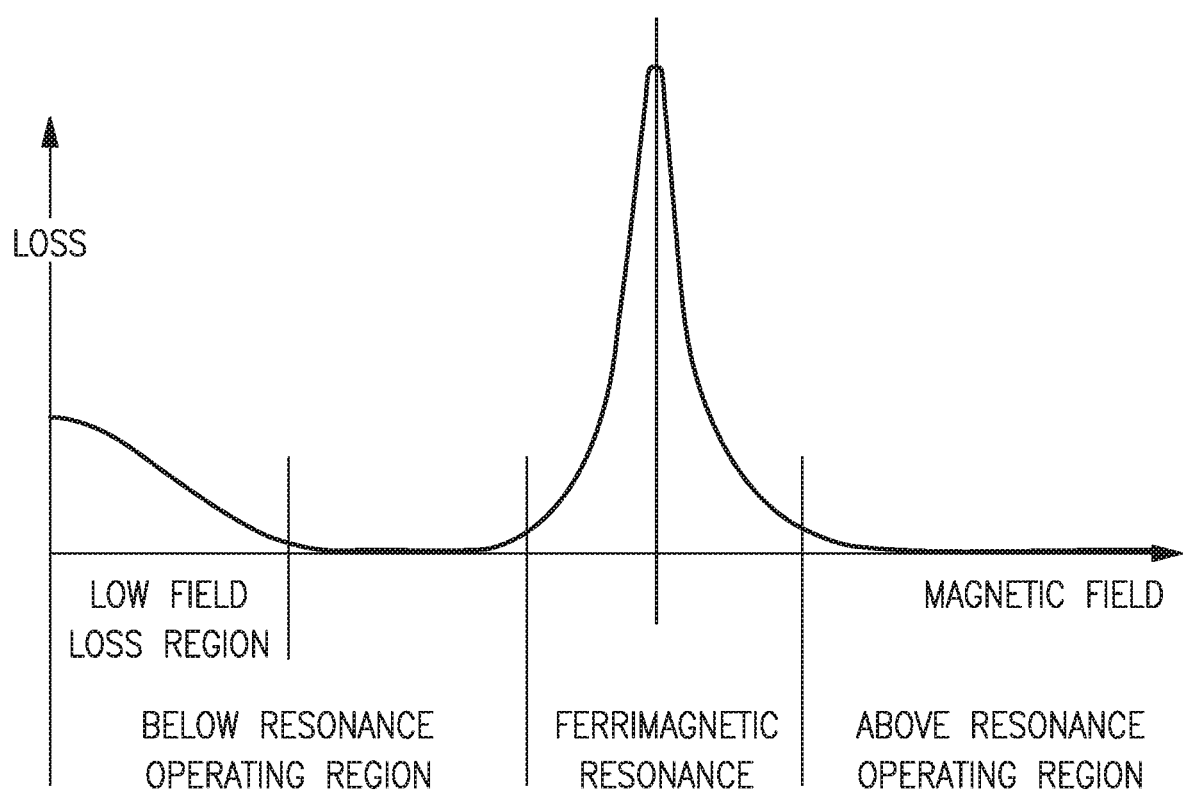
FIG. 3 illustrates a magnetic field v. loss chart.

Circulators generally can operate in either of an above-resonance operating region or a below-resonance operating region. This is shown in FIG. 3. In some embodiments, above-resonance frequencies can be advantageous for narrow band, sub 4 GHz circulators. For higher frequencies, the below-resonance region can be more advantageous.

Microstrip circulators in particular typically work in the below-resonance operating region. They use a very small magnet or can be self-biased, such as in the case of hexagonal ferrites. However, square tiles can be a difficult shape to magnetize uniformly, in particular for the all-ferrite microstrip circulators known in the art. Thus, they will operate close to the low field loss region. When transformers are mounted on the lossy unmagnetized ferrite, performance suffers. Further, increased power will make the poor performance even more apparent. Thus, circulators known in the art suffer from issues due to the ferrite tile being poorly magnetized, leading to poor insertion loss and intermodulation distortion (IMD), and power performance.

Co-Fired Microstrip Circulators/Isolators

Embodiments of the disclosure can improve overall magnetization and reduce performance issues that can occur for currently known microstrip circulators. Generally, the microstrip circulators can be formed by embedding a ferrite disc, such as an oxide ferrite disc made of yttrium iron garnet (YIG), directly into a dielectric substrate. The combination can then be co-fired to form a solid composite structure. Additionally circuitry, formed from silver or other metalized substances, for example, can be added. Without the co-firing process, circuit metallization would not be able to be applied due to the presence of adhesive between the disc and substrate that would be utilized to join the two if they were separately fired and that may melt during metallization. Embodiments of this disclosure can alleviate some of the significant problems of the art.

Any number of different ferrite disc materials that can be used. In some embodiments, the saturation magnetization levels of the ferrite disc material can range between 1000-5000 (or about 1000-about 5000) gauss.

Further, any number of different dielectric substrates known in the art can be used. Further, the dielectric can be formed form dielectric powder or low temperature co-fired ceramic (LTCC) tape. In some embodiments, the dielectric constant can be above 6, 10, 15, 20, 25, 30, 40, 50, or 60. In some embodiments, the dielectric constant can range from 6-30 (or about 6 to about 30). In some embodiments, the dielectric constant can be below about 60, 50, 40, 30, 25, 20, 15, or 10.

Figure 4A:
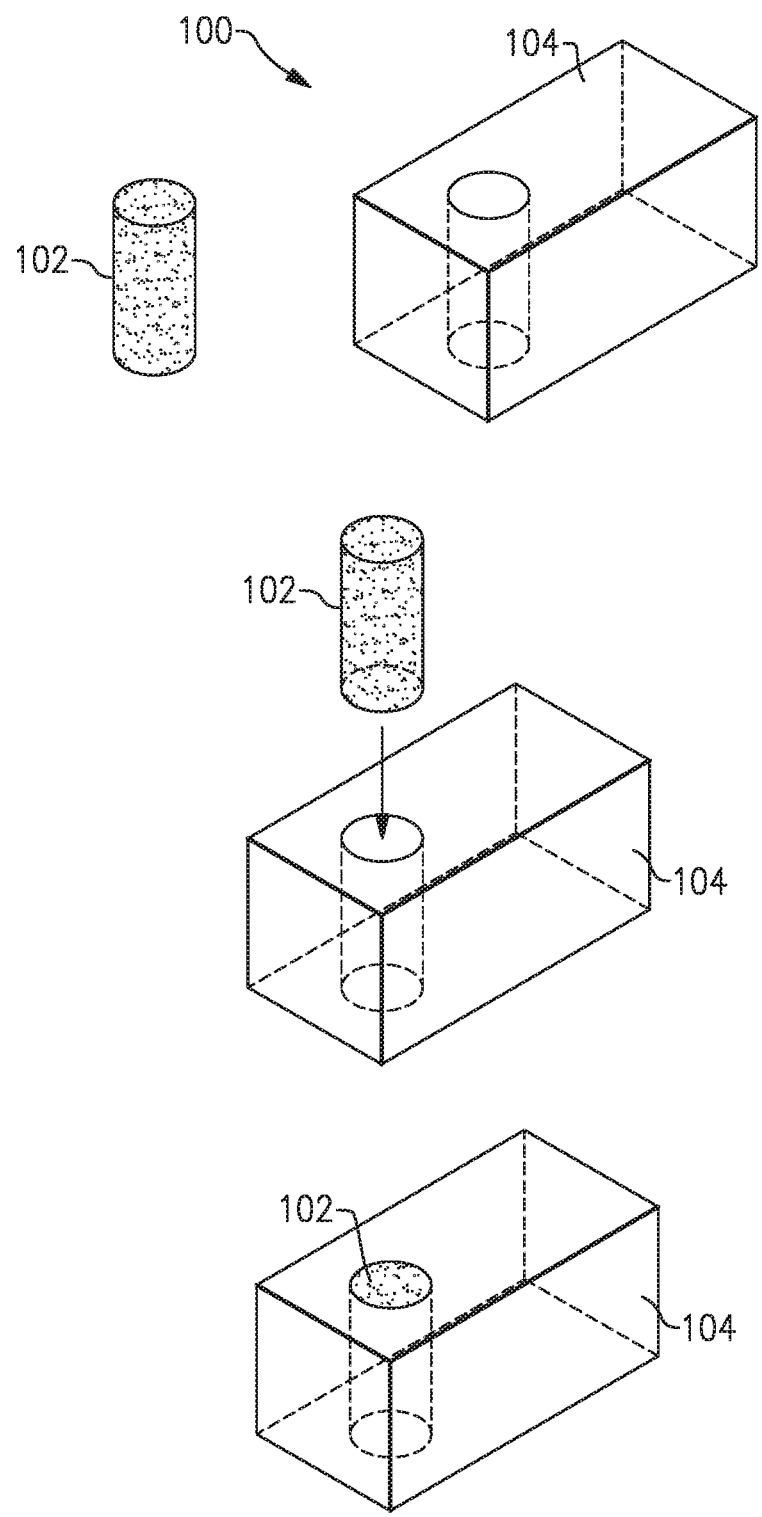
FIGS. 4A-B illustrate an embodiment of a composite structure having a ferrite cylinder within a rectangular prism or cylindrical substrate.
Figure 4B:
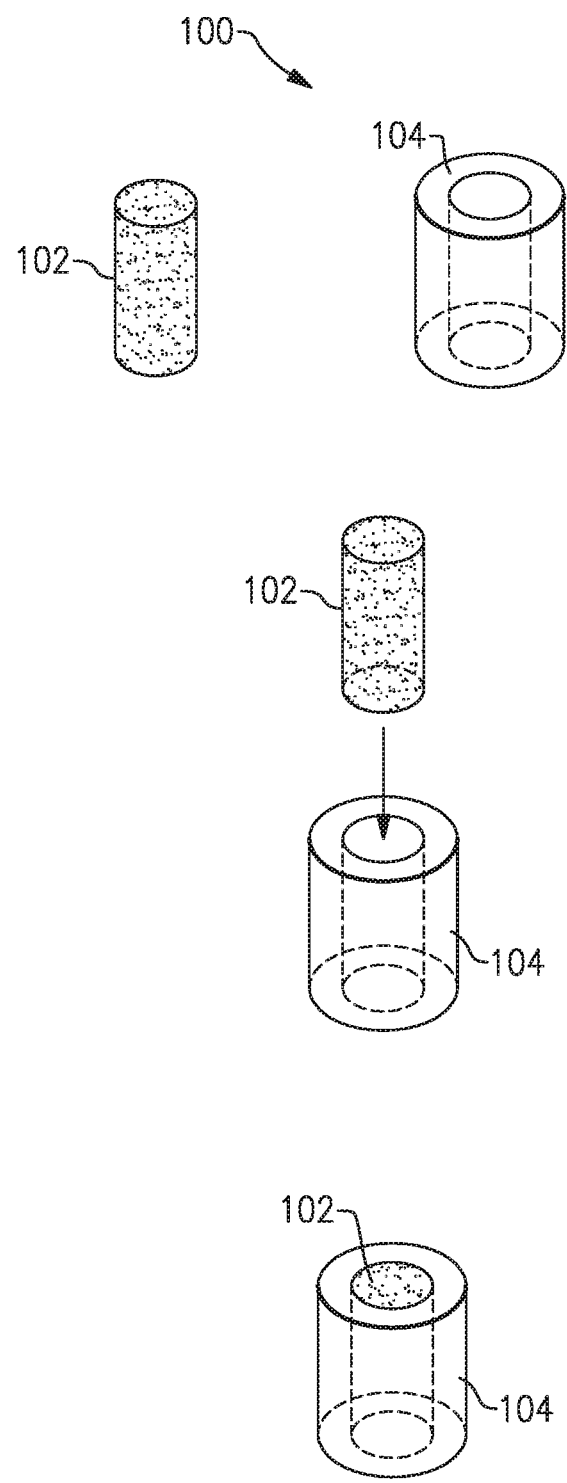

In particular, to form the composite microstrip circulator 100, a magnetic oxide disc 102, or other magnetic disc, can be inserted into an aperture of a dielectric substrate 104 as shown in FIGS. 4A-B. In some embodiments, the disc 102 can be a cylindrical rod, though the particular shape is not limiting. The disc 102 can be green, previously fired, or not-previously fired.

Figure 5A:
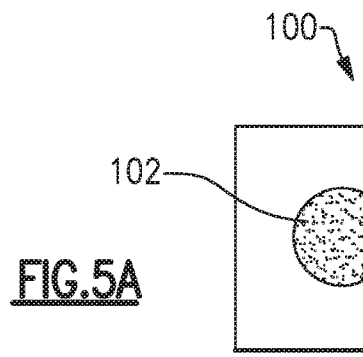
FIGS. 5A-B illustrate an embodiment of a composite tile with a square or circle shape.
Figure 5B:
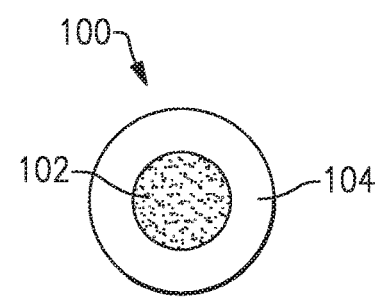

Further, the substrate 104 can generally be a rectangular prism as shown in FIG. 4A, but other shapes can be used as well such as the cylinder shown in FIG. 4B. Embodiments of the substrate 104 are disclosed in more detail below. Once the disc 102 is inside the substrate 104, the components can be co-fired together, using such a method as discussed in U.S. Pat. No. 7,687,014, hereby incorporated by reference in its entirety and discussed below. This co-firing process, further detailed below, can cause the substrate 104 to shrink around the disc 102 and hold it in place. This composite structure 100 can then be sliced to form the chip structure as shown in FIGS. 5A-B (FIG. 5A showing the rectangular prism slice and FIG. 5B showing the cylinder slice). However, in some embodiments, slicing is not performed and the components are co-fired together at their final thickness. In some embodiments, a plurality of different discs can be inserted into a single substrate in a plurality of different apertures.

Thus, in some embodiments a magnetic oxide disk can be co-fired into a square or rectangular dielectric substrate, or any other shaped substrate, which can then serve as a platform for other components, such as circuitry. This composite structure can then be magnetized to serve as a microstrip circulator and/or isolator package, for example, or the ferrite disc could have been magnetized prior to insertion. In some embodiments, the ferrite disc can be magnetized prior to the co-firing step.

Once the composite structure is formed, other components can be added onto the substrate, such as additional thin film circuits and the like. Thus, embodiments of the disclosure can form an integrated solution which can include a directional coupler and/or isolator in a package size which is not much larger than a standard isolator. In some embodiments, the disclosed circulator will be no larger (and depending on the ferrite/dielectric combination chosen could be smaller) than all current ferrite microstrip circulators.

Thus, using a co-firing process, a ferrite disc can be embedded into a dielectric tile, as shown in FIGS. 5A-B. The thin ferrite disc shown in the figure can be significantly easier to magnetize uniformly than a square or other oddly shaped piece known in the art. In some embodiments, the dielectric tile could be about 25 mm square though the particular dimensions are not limiting. This can be used in the 3-4 (or about 3-about 4) GHz region.

Figure 6:
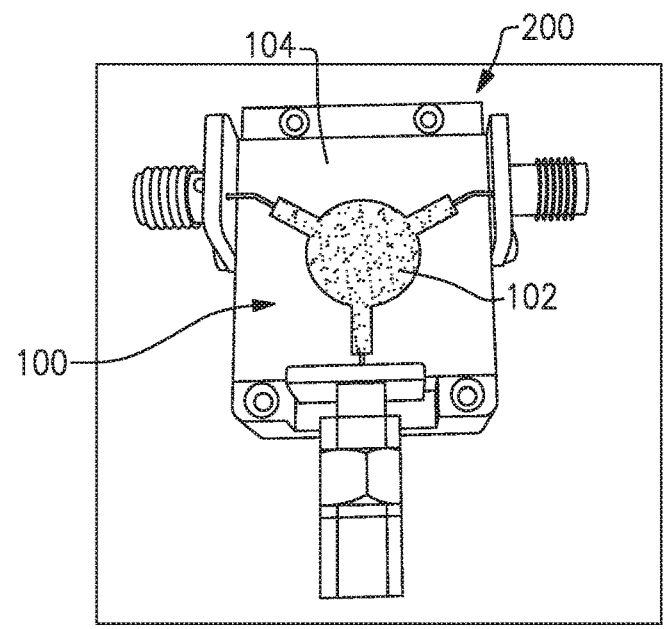
FIG. 6 illustrates an integrated microstrip circulator without a magnet.
Figure 7:
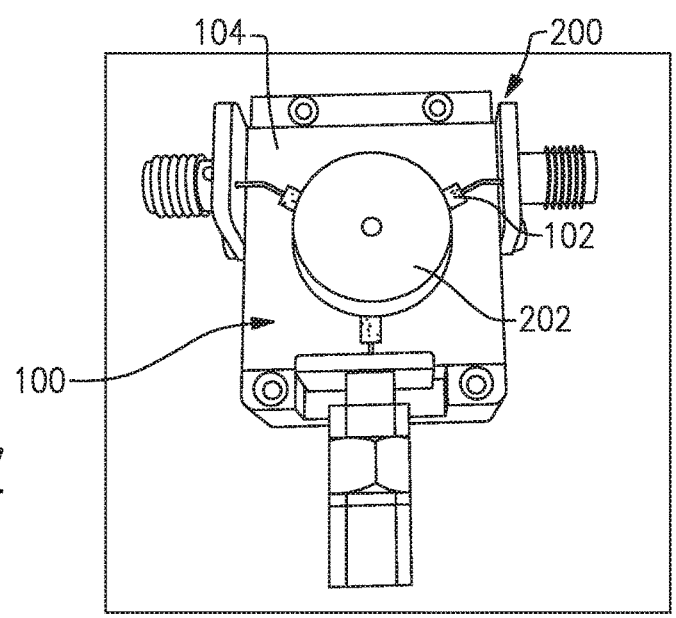
FIG. 7 illustrates an integrated microstrip circulator with a magnet.

Using the dielectric tile, a transformer can then be produced as shown in FIG. 6. As shown, the substrate 104 has space left over for other component attachments. After forming the transformer, only a small magnet 202 may be placed on the tile, as shown in FIG. 7. Thus, assembly time can be much shorter than previously done.

In addition to using the dielectric tile as the substrate for the impedance transformer, it could also be used as the substrate for the coupler, switch, and termination. Thus, a number of other components can be added onto the substrate after co-firing, reducing the overall footprint of the device. Further, circuit metallization could be added after the device has been co-fired.

Low Temperature Firing Dielectric Materials for Rings

Embodiments of the disclosure can be particularly advantageous for a co-firing process with a magnetic material, such as for the formation of circulators/isolators. In particular, they can be high dielectric magnetic materials with low firing temperatures (e.g., they can be fireable at a low temperature). Specifically, a rod of magnetic material can be inserted into an unfired ring formed from embodiments of the disclosed low temperature firing dielectric materials, such as shown in FIGS. 4A-B above (104 being the ring and 102 being the rod). The combination of the ring and the rod can then be co-fired together so that the ring shrinks around the rod. Both of these materials can be "fireable," meaning they have the ability to be fired or sintered in an oven/kiln/other heating device. In some embodiments, firing can change one or more properties of the material, such as the ceramic materials discussed herein. Embodiments of these assemblies can be used as isolators and/or circulators for radio frequency applications, such as for 5G applications.

Advantageously, this co-firing process can be performed without the use of adhesives/epoxies/glues, and thus can be considered a "glueless assembly." Conventional methods of forming a dielectric/magnetic assembly as disclosed herein include firing the fireable ring separate from the fireable rod due to the temperature for firing the ring being too high relative to the rod, which can lead to melting, or at least considerably damaging the properties of the internal rod.

Either both segments can be fired separately, or the ring can be fired first and then the ring/rod assembly is fired together. For each of these approaches, the ring will not sufficiently shrink around the rod and thus an adhesive will be needed to keep the ring and the rod attached to one another.

However, the use of adhesives has a number of drawbacks, and advantageously the disclosed material can form a composite structure without the need for such adhesive as the rod and ring can be co-fired together. For example, it is extremely difficult, if not impossible, to metallize the assembly once there is adhesive. This is because the temperature required for metallization is much higher than the use temperature for the adhesive, causing the adhesive to melt and/or lose adhesive.

Further, the glue is lossy, increasing the insertion loss of glued components. The dielectric loss of the glue at high frequencies is greater than that of the magnetic or the dielectric material. In addition, in some embodiments, voids may form within the layer of glue between the magnetic and dielectric materials, further increasing insertion loss and/or reducing uniformity of the magnetic/dielectric component.

In some embodiments, the material can have a dielectric constant ($\epsilon'$) of less than 10 (or less than about 10). Thus, embodiments of the disclosure can be used for 5G below-resonance applications. It can be advantageous to avoid moding and to offset the impedance effect of thinner substrates also used at high frequencies. Accordingly, values below 10 (or below about 10) may be used for above 20 GHz frequencies.

Further, embodiments of the material can have low dielectric constants (<10) suitable for co-firing with high magnetization spinels (for example nickel zinc ferrites) such as disclosed in U.S. Pat. Pub. No. 2017/0098885, hereby incorporated by reference in its entirety, in particular for high frequency (5G) applications. Embodiments of the material may be suitable for co-firing with high bismuth ferritic garnet materials, for example, those included in the TTHiE series, available from Skyworks Solutions, Inc.

Embodiments of the disclosed low firing dielectric material can have a scheelite or garnet structure which can be co-fired with high dielectric constant materials such as disclosed in U.S. Pat. Pub. No. 2018/0016155, hereby incorporated by reference in its entirety. The high dielectric constant magnetic rod can be a bismuth substituted high dielectric constant magnetic garnet.

In particular, the low firing dielectric material can be based on bismuth vanadate, which has the chemical formula $BiVO_4$. Bismuth-rich ferritic garnets with high dielectric constants, useful for miniaturized isolators and circulators, have firing temperatures lower than 1000° C. This limits the number of dielectric materials available to form co-fired assemblies since the dielectric material should be fired at a lower temperature than the bismuth-rich ferritic garnet. Bismuth vanadate ($BiVO_4$) is one example of a material that may be utilized as a dielectric material to form co-fired assemblies with bismuth-rich ferritic garnets. Bismuth vanadate is a favorable material for such implementations because of the relative simplicity in powder processing, the high dielectric constant (50-60), and the ability to adjust properties by adding other oxide materials. This includes aluminum oxide which may be added to regulate the thermal expansion behavior and prevent dielectric cracking, as well as to drop the dielectric constant of the composite material.

In some embodiments, aluminum oxide may be added to $BiVO_4$ to adjust the thermal expansion coefficient of the material. Titanium oxide and yttrium vanadate may also be added to $BiVO_4$ to form either two phase mixtures (alumina and titania) or a scheelite solid solution.

In some embodiments, the dielectric constant of $BiVO_4$ may be reduced and the thermal expansion coefficient modified with the addition of aluminum oxide. In some embodiments, the dielectric constant of $BiVO_4$ may be reduced and the firing temperature increased without creating a second phase by creating a solid solution with yttrium vanadate ($Bi_{1-x}Y_xVO_4$) or gadolinium vanadate ($Bi_{1-x}Gd_xVO_4$). In some embodiments, the dielectric constant of $BiVO_4$ may be increased by adding titanium oxide as a second phase.

Embodiments of modified $BiVO_4$ disclosed herein can have a sintering temperature (e.g., firing temperature) of below 900° C., in particular 650-800° C. In some embodiments, the material can have a sintering temperature of below 850° C. In some embodiments, the material can have a sintering temperature of below 900, 850, 800, or 750° C. (or below about 900, about 850, about 800, or about 750° C.). In some embodiments, the material can have a sintering temperature above 500, 550, 600, 650, or 700° C. (or above about 500, about 550, about 600, about 650, or about 750° C.).

Further, embodiments of the material can have a dielectric constant range of between 10 and 30 (or about 10 and about 30), between 20 and 80 (or about 20 and about 80), or between 20 and 70 (or about 20 and about 70). In some embodiments, the material can have a dielectric constant of above 10, 15, 20, 25, 30, 40, 50, 60 or 70 (or above about 10, 15, 20, 25, 30, 40, 50, 60, or 70). In some embodiments, the material can have a dielectric constant of below 80, 70, 60, 50, 40, 30, 25, 20, 15, or 10 (or below about 80, 70, 60, 50, 40, 30, 25, 20, 15, or 10).

In some embodiments, binder can be blended into the disclosed compositions. For example, binder can be polyvinyl alcohol (PVA) or poly ethylene glycol (PEG), alone or in combination. However, the type of binder is not limiting. For example, the binder can be introduced as 2% level of the total composition.

5G Applications

Embodiments of the disclosed composite microstrip circulators can be particularly advantageous for 5th generation wireless system (5G) applications, though could also be used for early 4G and 3G applications as well. 5G technology is also referred to herein as 5G New Radio (NR). 5G networks can provide for significantly higher capacities than current 4G system, which allows for a larger number of consumers in an area. This can further improve uploading/downloading limits and requirements. In particular, the large number of circulators, such as those described herein, needed for 5G (typically 1 per front end module or FEM) requires further integration of components. The disclosed embodiments of circulators can allow for this integration and thus can be particularly advantageous. Other components in the front end module will be microstrip or SMT based.

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Figure 8:
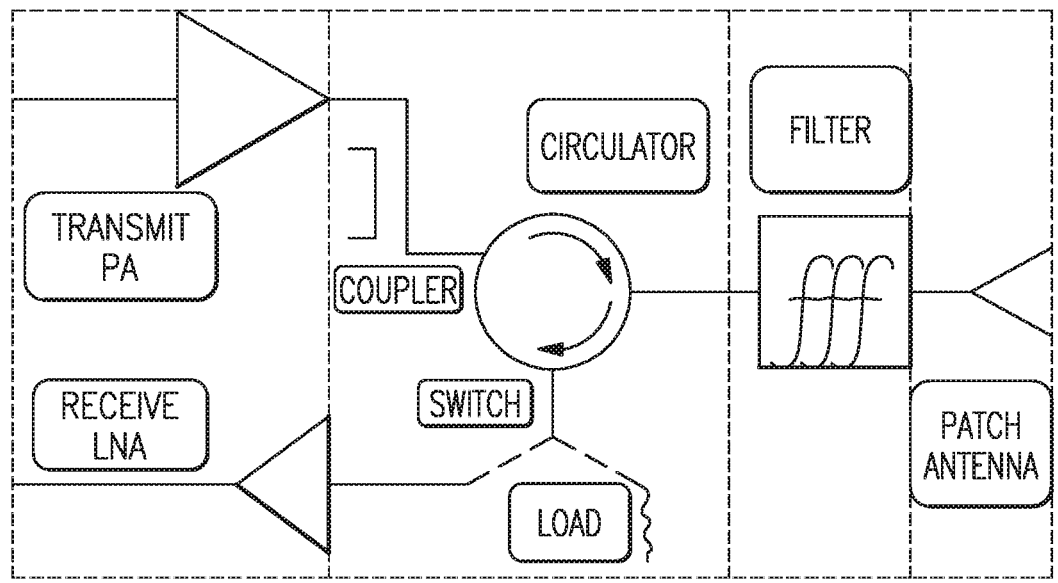
FIG. 8 illustrates a schematic of an antenna system.

FIG. 8 shows a simplified version of an RF transmission system, omitting drivers and switching logic. As shown, the system can include a number of different components, including a circulator. Thus, embodiments of the disclosure can be used as the circulator in the RF system, either for newly created systems or as improved replacements for previous systems. Specifically, embodiments of the disclosure relate to hybrid solutions using a stripline circulator, and microstrip or stripline topology for the remaining components.

Figure 9:
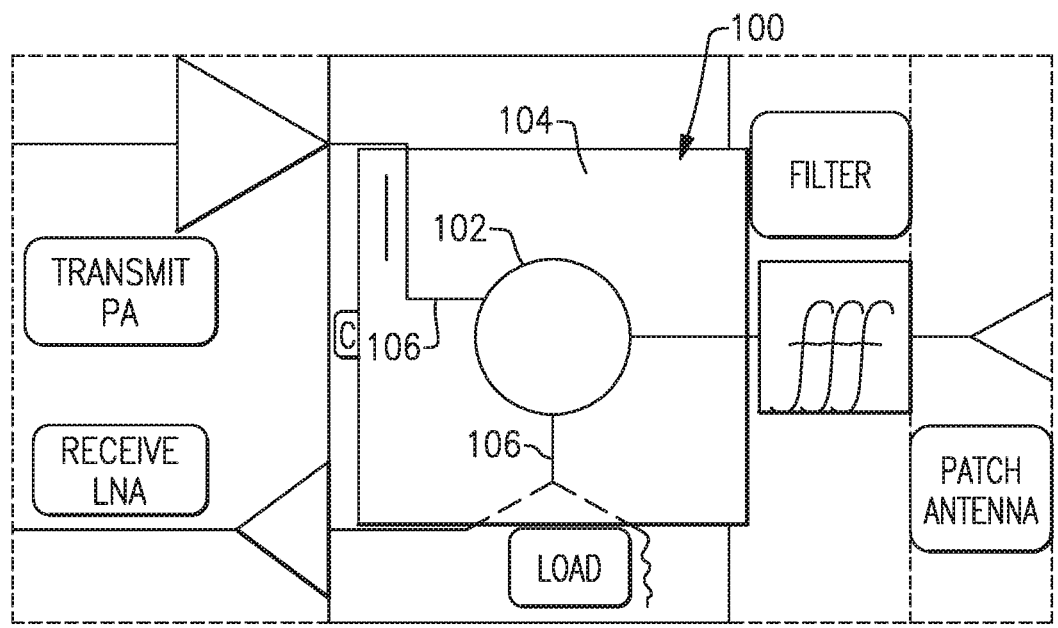
FIG. 9 illustrates a schematic of an antenna system with an embodiment of an integrated microstrip circulator.

FIG. 9 illustrates the integrated component of FIGS. 5A-B discussed above onto the simplified RF antenna structure. As shown, the substrate can include the co-fired ferrite/dielectric tile for the circulator. In addition, a coupler, switch, and load can also be applied to the dielectric tile outside of the ferrite. The conductors and the ground plane could be in a thick film silver. In some embodiments, the circulator subassembly can also be integrated with the power amplifier (PA) and loud noise amplifier (LNA) modules.

Embodiments of the disclosure can have advantages over circulators known in the art. For example,

- Couplers and other transmission lines have much lower insertion loss compared with other couplers, such as semiconductor couplers
- Coupling is more consistent
- Loads can dissipate heat more easily compared with soft substrate
- Circulators have lower loss than all-ferrite substrate based devices
- The dielectric is temperature stable, assisting the coupler and circulator's performance
- The size of the devices can be reduced by using higher dielectric constant ceramic dielectric if required Further, embodiments of the ceramic circulator can have the following advantages:

- Heat/power dissipation/thermal conductivity for PA and load
- Isotropic dielectric (except TTB) for coupler/filter design
- Range of dielectric constant (4-100+) for size reduction
- Low dielectric loss (coupler/filter)
- Tight dielectric constant tolerance (coupler/filter/antenna)
- Stable dielectric constant over temperature (coupler/filter/circulator)
- Modest Cost On the other hand, soft substrate (e.g., softboards) can have the following disadvantages:

- Poor conductivity due to plastic conductivity
- Anisotropic (xy versus z direction)
- Dielectric constants limited to between only about 3-10
- Higher losses
- Looser tolerances
- Unstable over temperature Accordingly, embodiments of the disclosure can have significant advantages over circulators previously known in the art.

Figure 10:
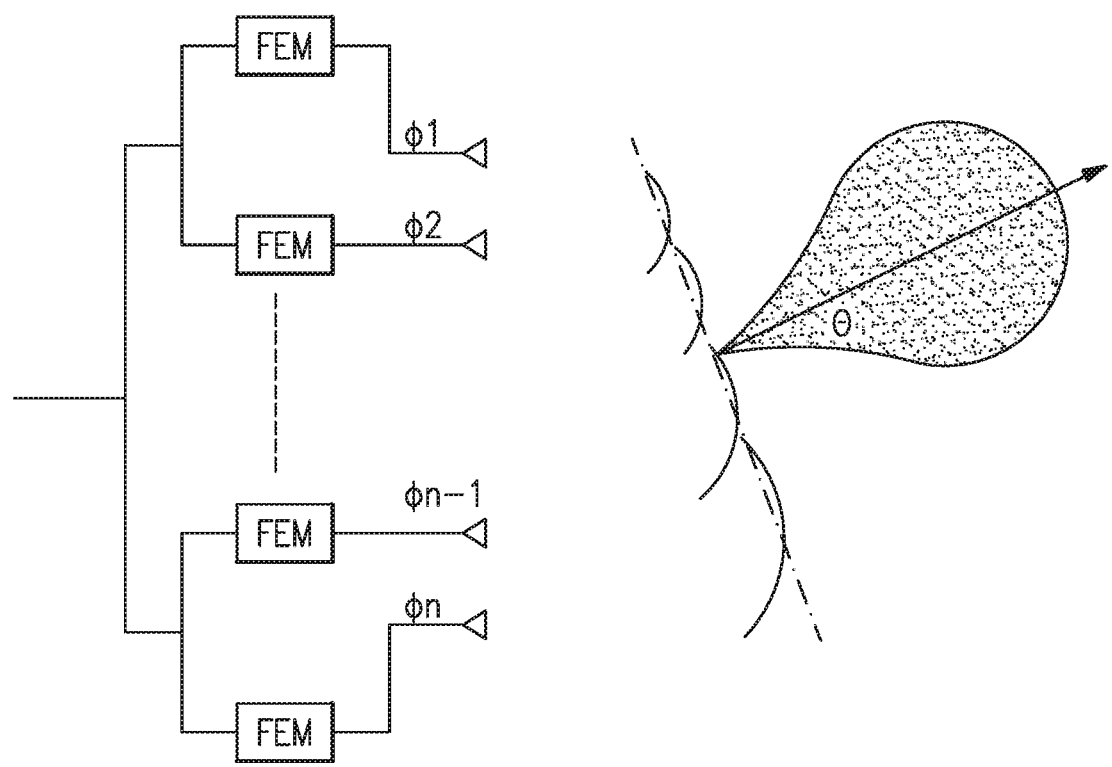
FIG. 10 illustrates a multiple-input multiple-output (MIMO) system incorporating embodiments of the disclosure.

FIG. 10 illustrates an embodiment of a multiple-input and multiple-output (MIMO) system that the disclosed microstrip circulators can be incorporated into. With the advent of massive MIMO for 5G systems, individual antennas will be replaced with antenna arrays with, for example, 64 array elements. Each element can be fed by a separate front end module (FEM) including the blocks shown in FIGS. 8 and 9 in which embodiments of the microstrip circulator formed on the co-fired tile can be an integral component.

Figure 11:
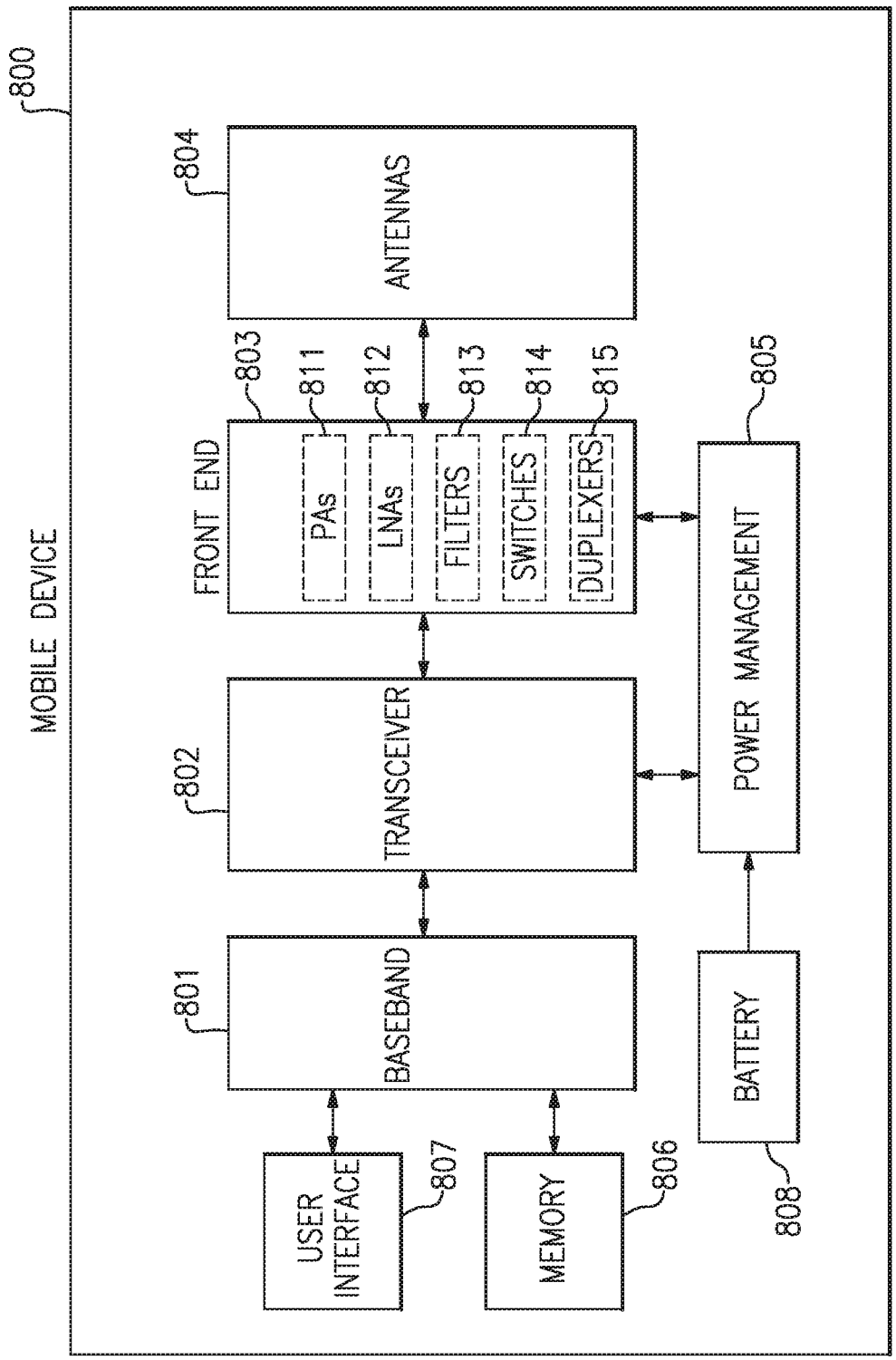
FIG. 11 is a schematic diagram of one example of a mobile device.

FIG. 11 is a schematic diagram of one example of a mobile device 800. The mobile device 800 includes a baseband system 801, a transceiver 802, a front end system 803, antennas 804, a power management system 805, a memory 806, a user interface 807, and a battery 808 and can interact with base stations including embodiments of the microstrip circulators disclosed herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 11 as the transceiver 802. In one example, separate components (for instance, separate circuits or dies) can be provided for handling certain types of RF signals.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas associated transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

Figure 12:
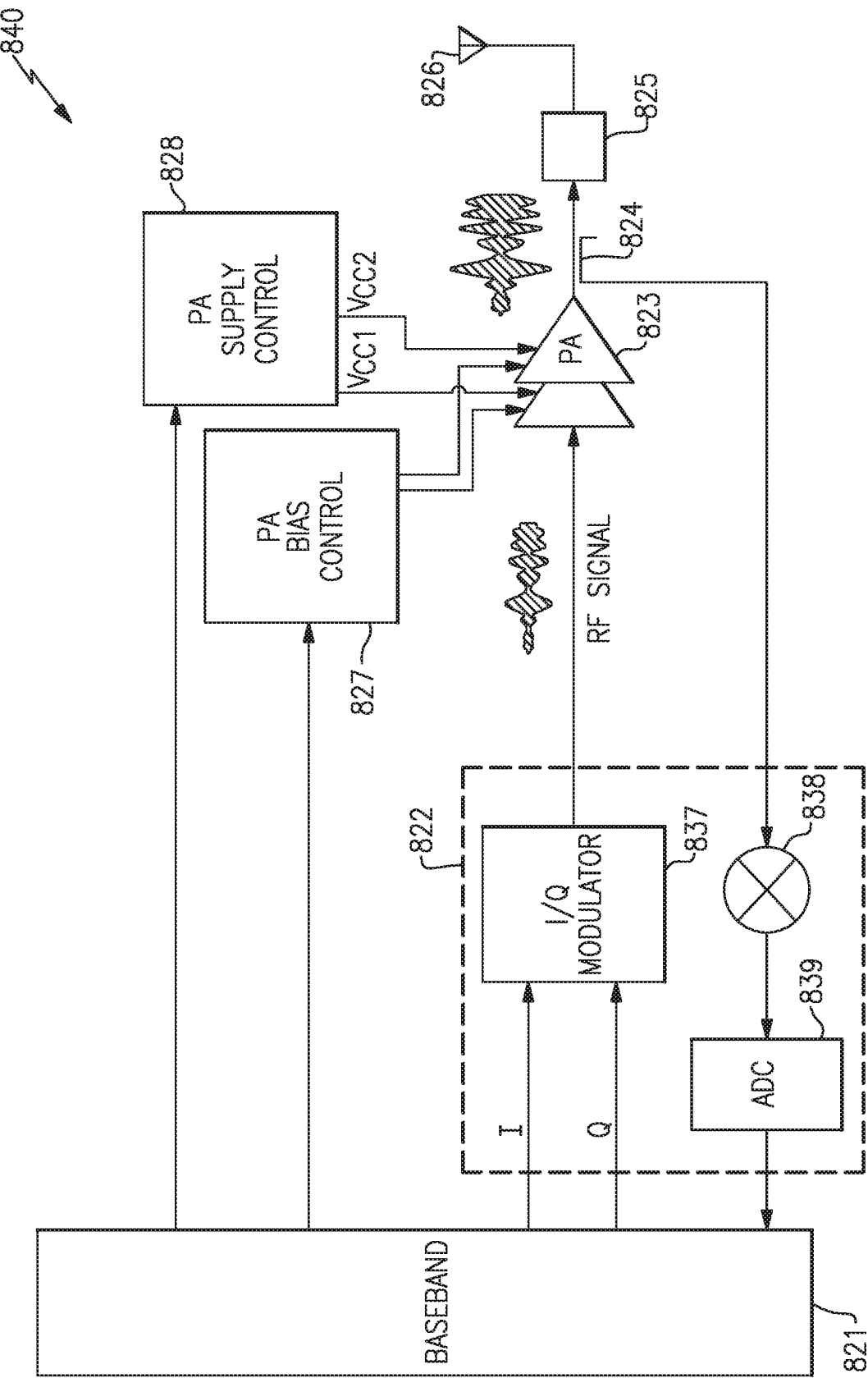
FIG. 12 is a schematic diagram of a power amplifier system according to one embodiment.

FIG. 12 is a schematic diagram of a power amplifier system 840 according to one embodiment. The illustrated power amplifier system 840 includes a baseband processor 821, a transmitter 822, a power amplifier (PA) 823, a directional coupler 824, a bandpass filter 825, an antenna 826, a PA bias control circuit 827, and a PA supply control circuit 828. The illustrated transmitter 822 includes an I/Q modulator 837, a mixer 838, and an analog-to-digital converter (ADC) 839. In certain implementations, the transmitter 822 is included in a transceiver such that both transmit and receive functionality is provided. Embodiments of the disclosed microstrip circulators can be incorporated into the power amplifier system.

Methodology

Figure 13:
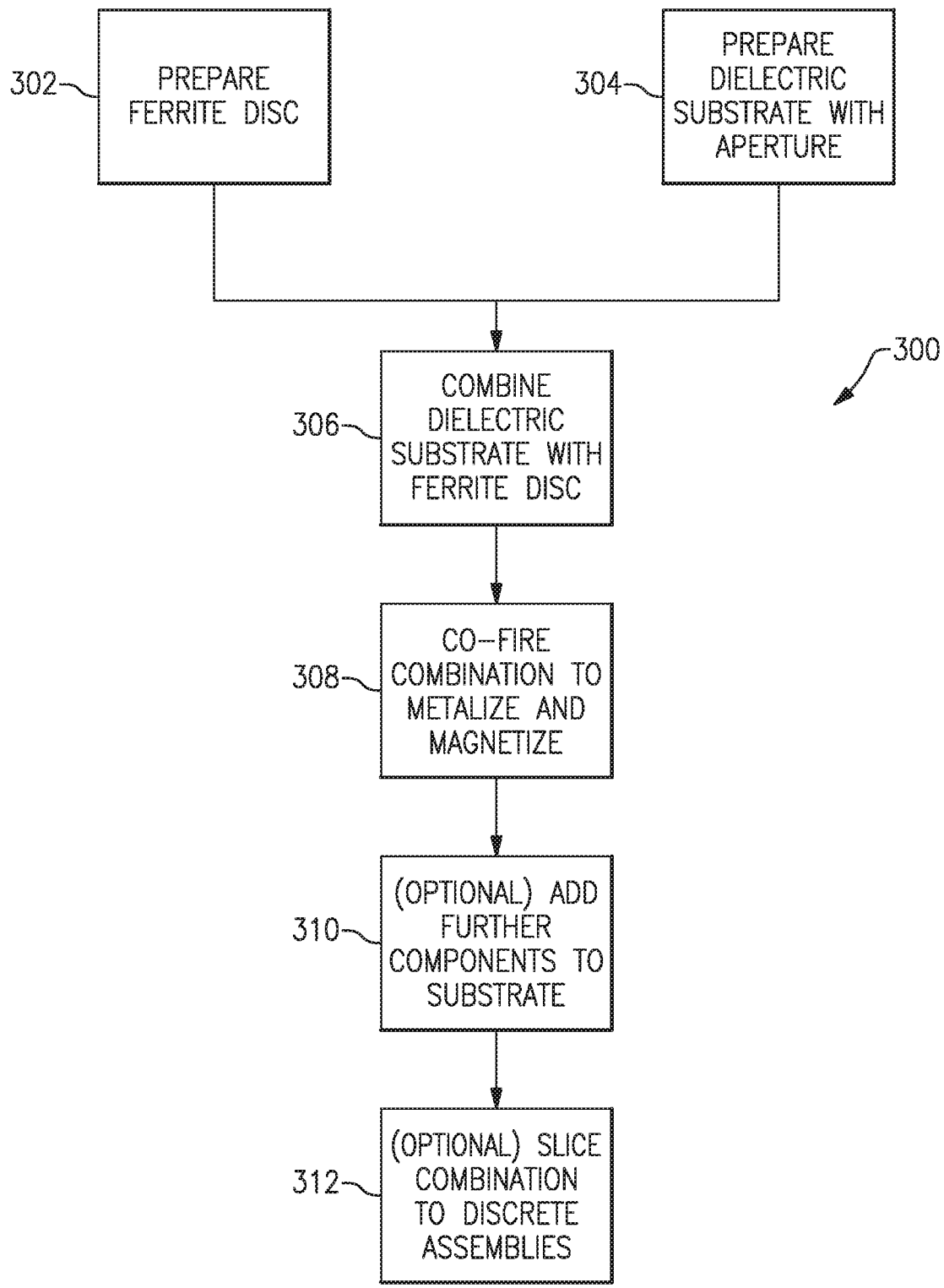
FIG. 13 illustrates a method of forming a composite integrated microstrip circulator.

Disclosed herein are embodiments of a process for making an integrated microstrip component. FIG. 13 discloses an embodiment of a process 300 that can be used.

At step 302, a ferrite disc or cylinder can be formed from a magnetic ceramic material by any suitable conventional process known in the art for making such elements, i.e., magnetic oxides of the types used in high frequency electronic components. Similarly, at step 304, a substrate can be formed from a dielectric material by any suitable conventional process. In some embodiments, the ferrite disc can be sintered by firing it in a kiln. Some examples of materials and firing temperatures are set forth below, following this process flow description. However, persons skilled in the art to which the invention relates understand that the materials and processes by which magnetic ceramic and dielectric ceramic elements of this type are made are well known in the art. Therefore, suitable materials and temperatures are not listed exhaustively. All such suitable materials and process for making such rods, cylinders and similar elements of this type are intended to be within the scope of the invention.

At step 306, the disc can be combined into the dielectric substrate with the aperture. For example, the outside surface of the disc can be machined to ensure it is of an outside diameter (OD) that is less than the inside diameter (ID) of the substrate aperture. In some embodiments, the OD is slightly smaller than the ID to enable the disc to be inserted into the substrate.

In some embodiments, the pre-fired disc can be received in an unfired or "green" substrate to form the composite assembly 100 shown in FIGS. 4A-B.

At step 308, the disc and substrate can be co-fired. That is, composite assembly 100 is fired. The co-firing temperature can be lower than the temperature at which disc was fired, to ensure that the physical and electrical properties of the disc remain unchanged. The co-firing temperature can be within the well-known range in which such components are conventionally fired. Importantly, co-firing causes the substrate to shrink around the disc, thereby securing them together. Afterwards, the outside surface of the composite assembly 100 can then be machined to ensure it is of a specified or otherwise predetermined OD. Further, this step can be used to metalize and/or magnetize the composite assembly 100 if the ferrite disc has not previously been magnetized.

Steps 310 and 312 show optional steps that can be taken after the co-firing of the composite assembly 100. For example, additional components can be added 310 onto the substrate, such as circuitry, to form final electronic components. Further, in some embodiments the composite assembly 100 can be sliced 312, or otherwise partitioned, to form a number of discrete assemblies. In some embodiments, both these optional steps can be performed and the particular order is not limiting. In some embodiments, only one of the optional steps can be taken. In some embodiments, neither of the optional steps can be taken.

Accordingly, composite assemblies 100 can be used in manufacturing high frequency electronic components in the same manner as conventionally-produced assemblies of this type. However, the method of the present invention is more economical than conventional methods, as the invention does not involve the use of adhesives.

Figure 14:
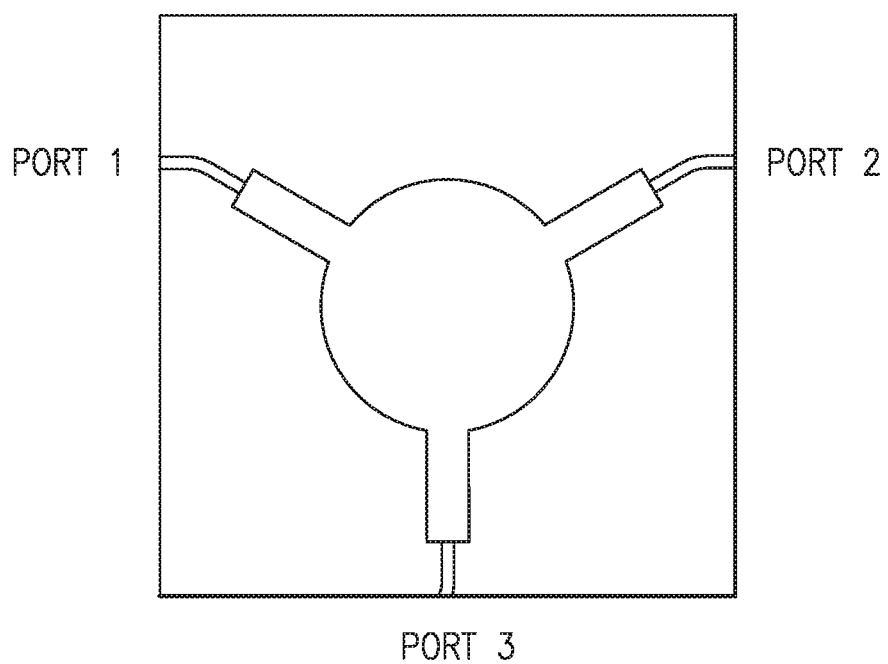
FIG. 14 illustrates an embodiment of an integrated microstrip circulator.

FIG. 14 illustrates an example embodiment of a circulator as discussed herein. Thick film silver can be printed as the circuit. As per standard circulator applications, the circulator includes Port 1, Port 2, and Port 3. One of these ports can be blocked off to form an isolator.

Example 1

Figure 15:
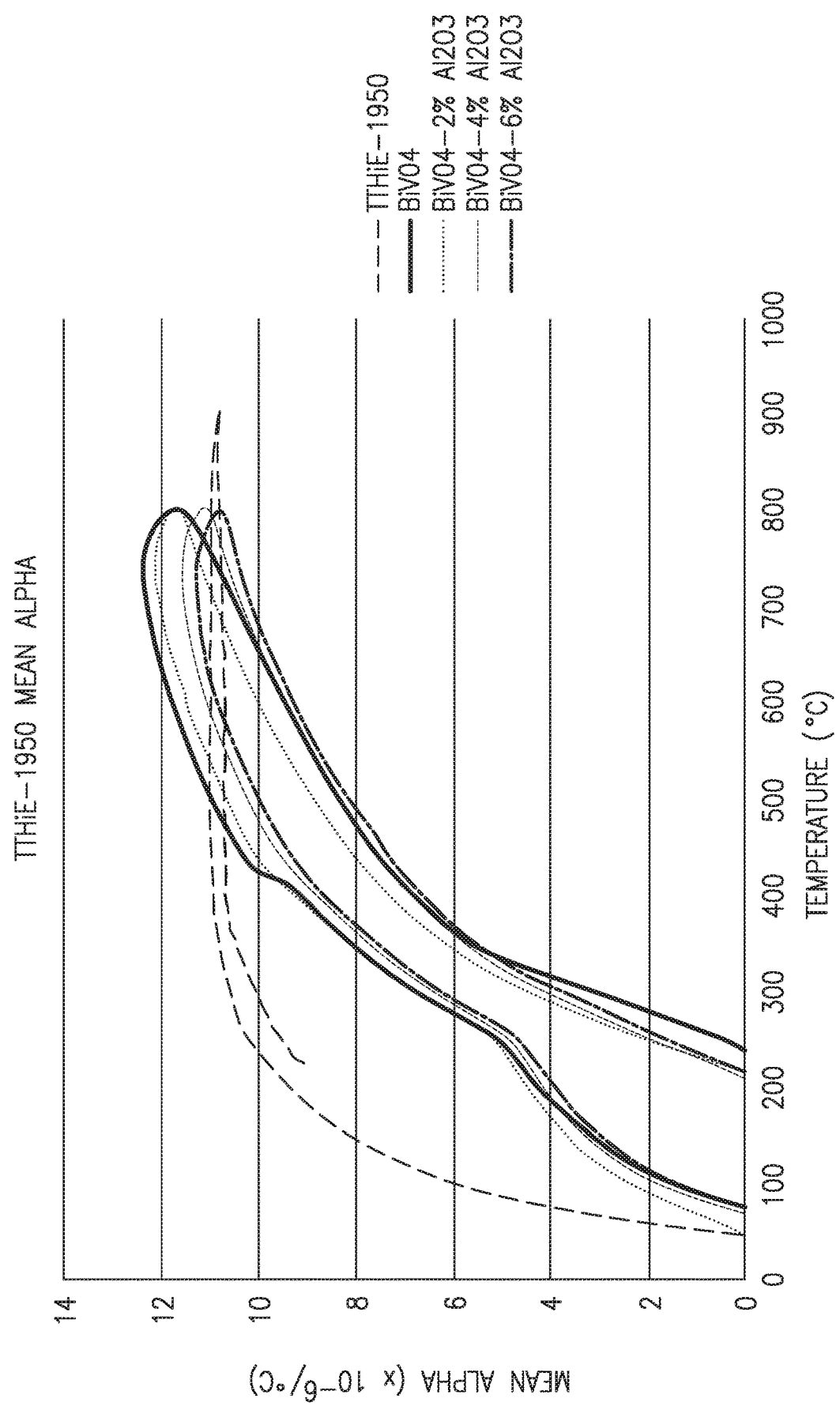
FIG. 15 illustrates results of testing of coefficient of thermal expansion (TCE) of samples of materials disclosed herein.

Testing was performed to compare the TCE of the high bismuth ferritic garnet material TTHiE-1950, available from Skyworks Solutions, Inc., to that of $BiVO_4$ and $BiVO_4$ with various amounts of $Al_2O_3$ added at different temperatures. The results of this testing is illustrated in FIG. 15, in which the TCE of the materials is referred to as "Alpha." As can be seen as the amount of $Al_2O_3$ added to the $BiVO_4$ material was increased to 6 wt %, the TCE of the $BiVO_4$—$Al_2O_3$ material approached that of the TTHiE-1950 at temperatures approaching 800° C. The TCE of $BiVO_4$ without $Al_2O_3$ and $BiVO_4$—$Al_2O_3$ with less than 6 wt % $Al_2O_3$ overshot the TCE of the TTHiE-1950 at higher temperatures and the TCE of the $BiVO_4$ without $Al_2O_3$ and $BiVO_4$—$Al_2O_3$ with all of the compositions tested undershot the TCE of the TTHiE-1950 at lower temperatures. Each of the $BiVO_4$ without $Al_2O_3$ and $BiVO_4$—$Al_2O_3$ samples exhibited hysteresis in TCE with change in temperature, which was unexpected.

Example 2

Table 1 below illustrates the observed quality factor Q, the quality-frequency factor QF (Q×frequency), the dielectric constant ε', and theoretical density of a sample of $BiVO_4$ and $BiVO_4$ samples including different weight percentages of aluminum oxide ($Al_2O_3$):

TABLE 1

| Material | Q | Q × frequency (GHz) | Dielectric Constant | Theoretical Density |
|---|---|---|---|---|
| $BiVO_4$ | 66 | 453 | 64.3 | 6.949 g/cc |
| $BiVO_4$ + 2% $Al_2O_3$ | 106 | 832 | 49.67 | 6.890 g/cc |
| $BiVO_4$ + 4% $Al_2O_3$ | 110 | 1034 | 34.03 | 6.830 g/cc |
| $BiVO_4$ + 6% $Al_2O_3$ | 112 | 1147 | 28.55 | 6.771 g/cc |

As can be seen, the addition of the $Al_2O_3$ increases the dielectric constant of the material as compared to pure $BiVO_4$.

Example 3

Samples of $BiVO_4$ with various amounts of added $Al_2O_3$, $TiO_2$, and $GdVO_4$ were prepared and analyzed by X-Ray diffraction to determine the phases that existed in the different samples. The observed phases present in the tested samples are tabulated in Table 2 below:

TABLE 2

| Material | Phases Detected |
|---|---|
| $BiVO_4$ | $BiVO_4$ |
| $BiVO_4$ + 2 weight % $Al_2O_3$ | $BiVO_4$ + $Bi_4V_2O_{11}$ (trace) |
| $BiVO_4$ + 4 weight % $Al_2O_3$ | $BiVO_4$ + $Bi_4V_2O_{11}$ (trace) |
| $BiVO_4$ + 6 weight % $Al_2O_3$ | $BiVO_4$ + $Bi_4V_2O_{11}$ (trace) |
| 99 weight % $BiVO_4$ + 1 weight % $TiO_2$ | $BiVO_4$ + $Bi_4V_2O_{11}$ |
| 98 weight % $BiVO_4$ + 2 weight % $TiO_2$ | $BiVO_4$ + $Bi_4V_2O_{11}$ |
| 95 weight % $BiVO_4$ + 5 weight % $TiO_2$ | $BiVO_4$ + $Bi_4V_2O_{11}$ + $Bi_2Ti_4O_{11}$ |
| 90 weight % $BiVO_4$ + 10 weight % $TiO_2$ | $BiVO_4$ + $Bi_4V_2O_{11}$ + $Bi_2Ti_4O_{11}$ + $TiO_2$ (rutile) |
| 95 weight % $BiVO_4$ + 5 weight % $GdVO_4$ | $BiVO_4$ (scheelite) + $GdVO_4$ (zircon) |
| 90 weight % $BiVO_4$ + 10 weight % $GdVO_4$ | $BiVO_4$ (scheelite) + $GdVO_4$ (zircon) |
| 80 weight % $BiVO_4$ + 20 weight % $GdVO_4$ | $BiVO_4$ (scheelite) + $GdVO_4$ (zircon) |
| 50 weight % $BiVO_4$ + 50 weight % $GdVO_4$ | $BiVO_4$ (scheelite) + $GdVO_4$ (zircon) |

From the foregoing description, it will be appreciated that inventive products and approaches for composite microstrip circulators/isolators are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A composite material for use as a radiofrequency component comprising:
    a low temperature fireable outer material, the low temperature fireable outer material having a garnet or scheelite structure; and
    a high dielectric constant inner material located within the outer material, the high dielectric constant inner material having a dielectric constant above 30, the low temperature fireable outer material and the high dielectric constant inner material being configured to be co-fired together at a temperature between 650-900° C. to form an integrated magnetic/dielectric assembly without the use of adhesive or glue.

2. The composite material of claim 1 wherein the low temperature fireable outer material includes $BiVO_4$.

3. The composite material of claim 1 wherein the high dielectric constant inner material is shaped like a disc and the low temperature fireable outer material is shaped like a ring.

4. The composite material of claim 1 wherein the low temperature fireable outer material includes a combination of $BiVO_4$ and $Al_2O_3$.

5. The composite material of claim 4 wherein the low temperature fireable outer material has a dielectric constant between 20 and 80.

6. The composite material of claim 4 wherein the $Al_2O_3$ is present in the low temperature fireable outer material an amount up to about 6 wt %.

7. The composite material of claim 4 wherein $Bi_4V_2O_{11}$ is present in the low temperature fireable outer material as a phase separate from the $BiVO_4$.

8. The composite material of claim 4 wherein the low temperature fireable outer material further includes one or more of yttrium vanadate, gadolinium vanadate, or titanium oxide.

9. The composite material of claim 4 wherein the low temperature fireable outer material further includes titanium oxide in an amount up to 10 wt %.

10. The composite material of claim 8 wherein one or both of yttrium vanadate, gadolinium vanadate form a solid solution with the $BiVO_4$ in the low temperature fireable outer material.

11. The composite material of claim 4 wherein the low temperature fireable outer material further includes titanium dioxide as a phase separate from the $BiVO_4$.

12. The composite material of claim 4 wherein the low temperature fireable outer material further includes gadolinium vanadate in an amount up to 50 wt %.

13. The composite material of claim 8 wherein $Bi_4V_2O_{11}$ and $BiVO_4$ are present in the low temperature fireable outer material as separate phases.

14. The composite material of claim 13 wherein $Bi_4V_2O_{11}$, $BiVO_4$, and $Bi_2Ti_4O_{11}$ are present in the low temperature fireable outer material as separate phases.

15. The composite material of claim 14 wherein $Bi_4V_2O_{11}$, $BiVO_4$, $Bi_2Ti_4O_{11}$, and $TiO_2$ are present in the low temperature fireable outer material as separate phases.

16. The composite material of claim 8 wherein $Bi_4V_2O_{11}$ and $GdVO_4$ are present in the low temperature fireable outer material as separate phases.

* * * * *